June 25, 1963

G. H. ALLGEYER 3,095,082

METHOD FOR HANDLING GLASSWARE ARTICLES

Original Filed June 5, 1958

INVENTOR.
Guy H. Allgeyer
BY
J. R. Nelson
+ W. A. Schavel
ATTORNEYS

June 25, 1963
G. H. ALLGEYER
3,095,082
METHOD FOR HANDLING GLASSWARE ARTICLES
Original Filed June 5, 1958
12 Sheets-Sheet 3
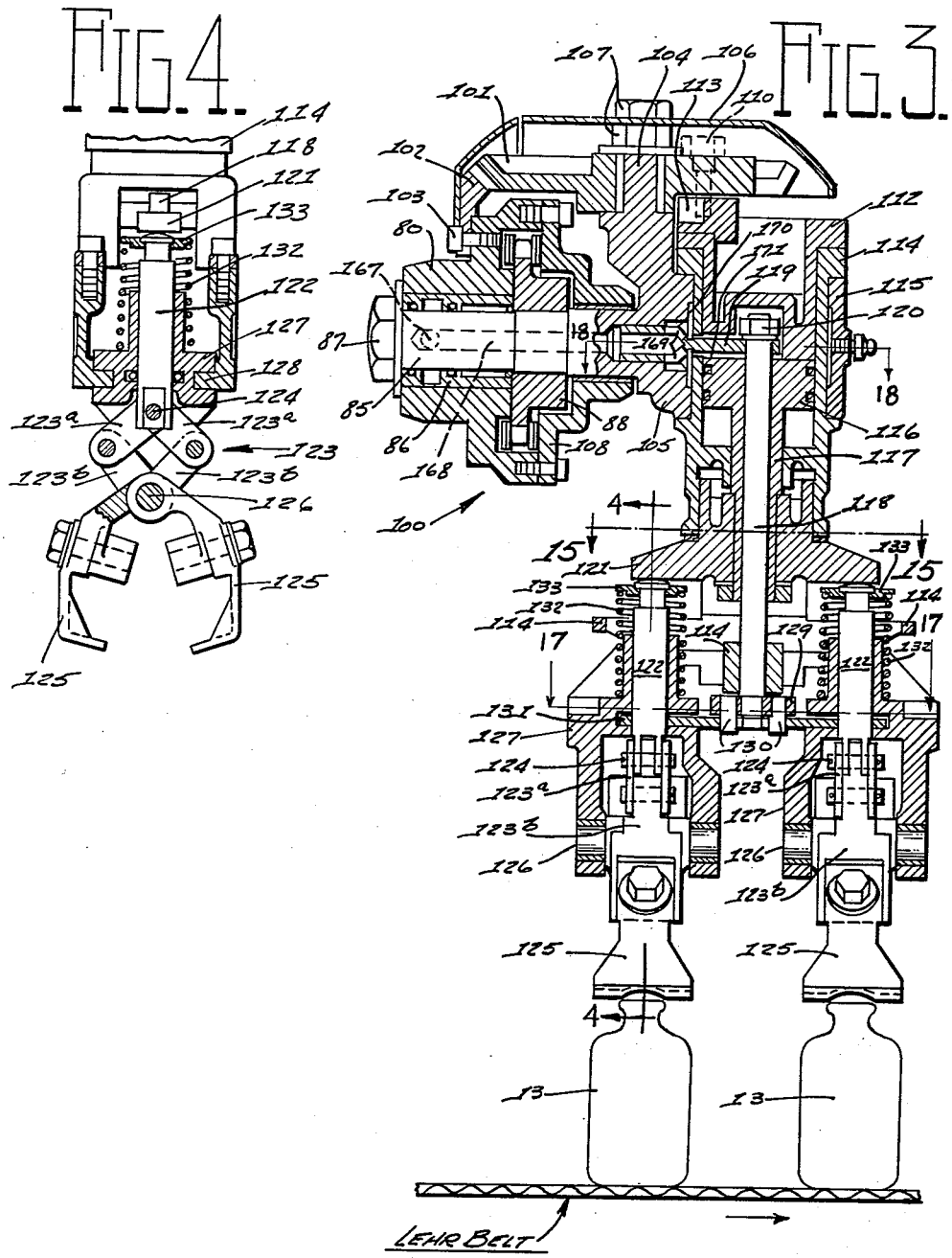
INVENTOR.
Guy H. Allgeyer
BY
ATTORNEYS

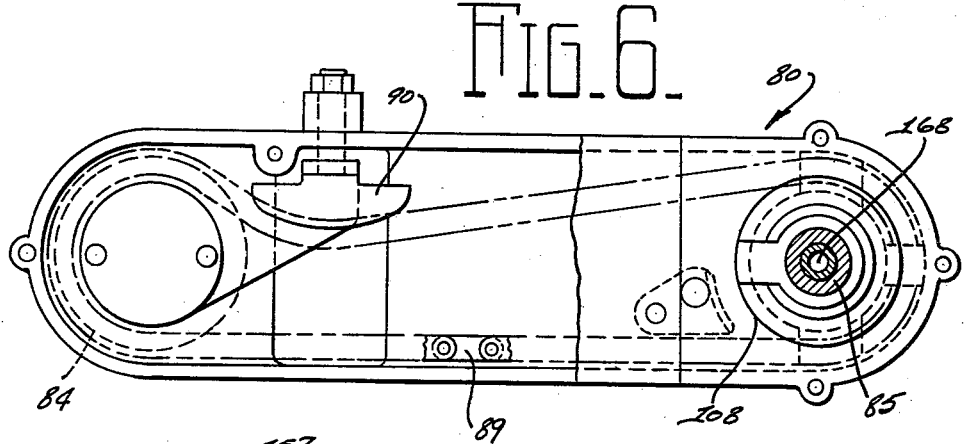
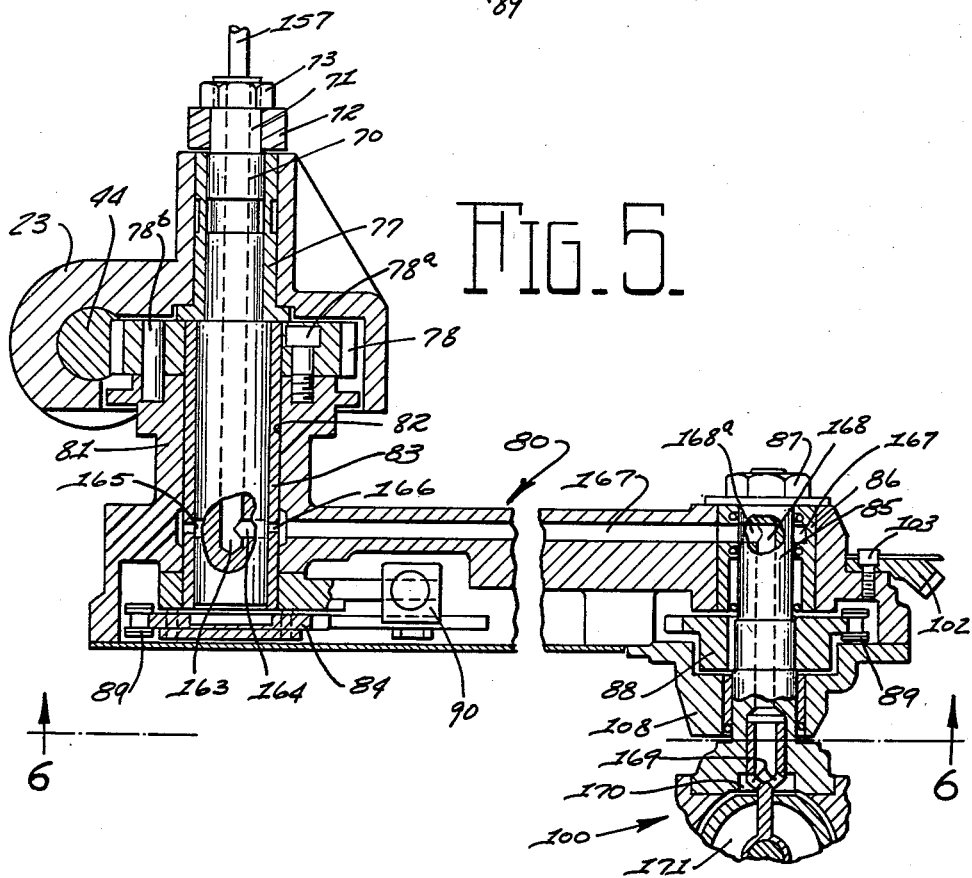

June 25, 1963
G. H. ALLGEYER
3,095,082
METHOD FOR HANDLING GLASSWARE ARTICLES
Original Filed June 5, 1958
12 Sheets-Sheet 5
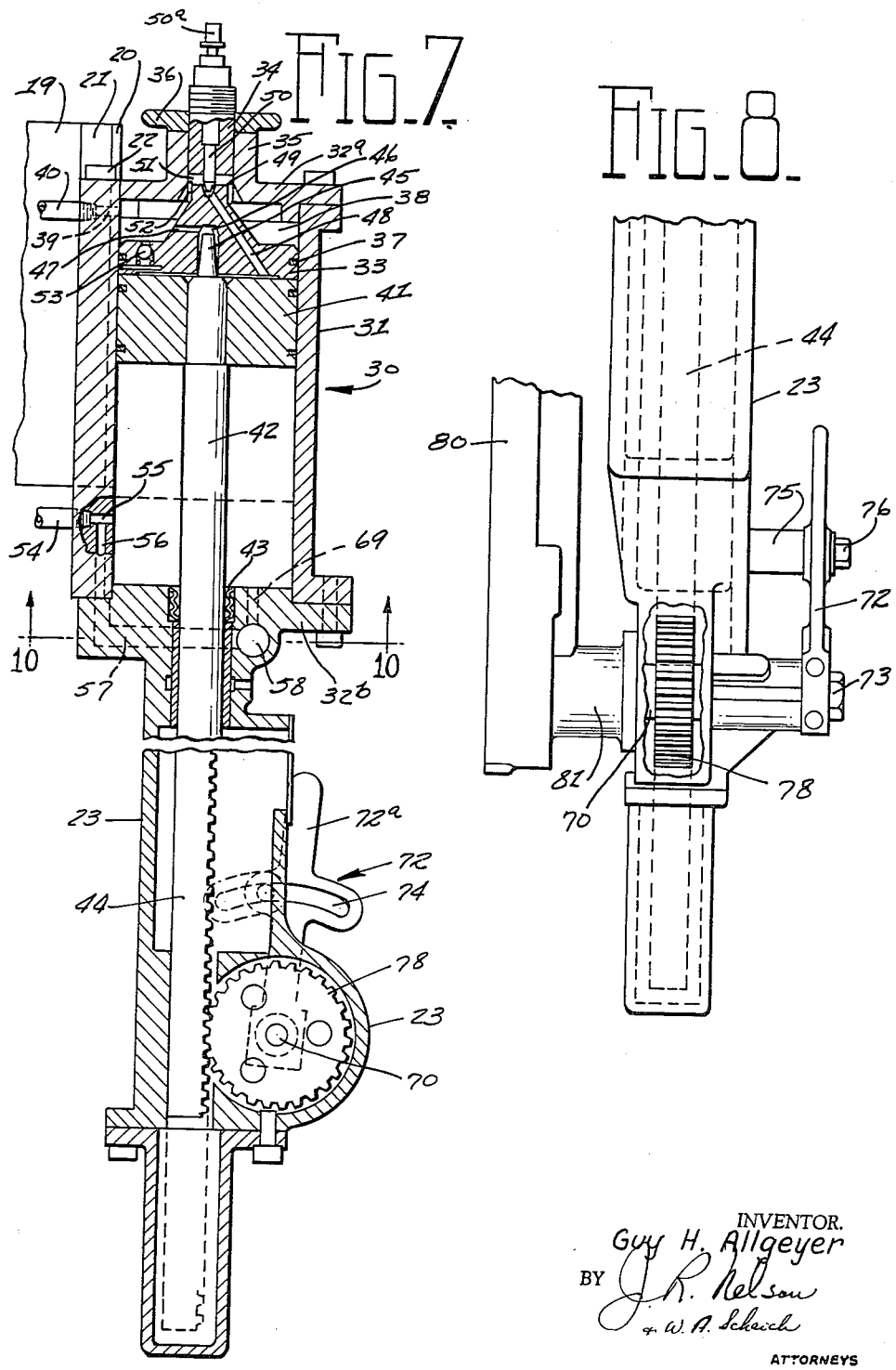
INVENTOR.
Guy H. Allgeyer
BY J. R. Nelson
+ W. A. Scheich
ATTORNEYS

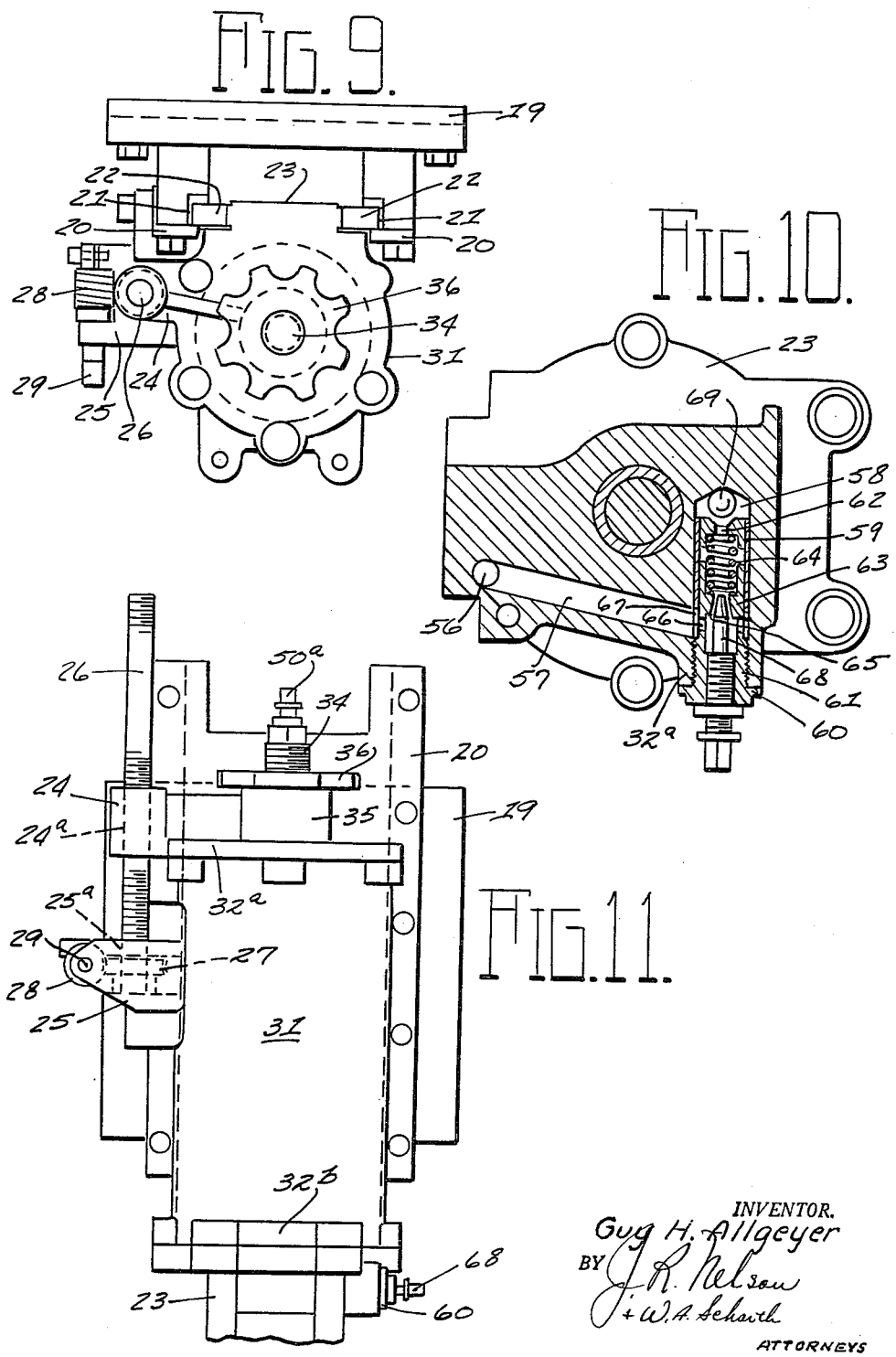

June 25, 1963   G. H. ALLGEYER   3,095,082
METHOD FOR HANDLING GLASSWARE ARTICLES
Original Filed June 5, 1958   12 Sheets-Sheet 7
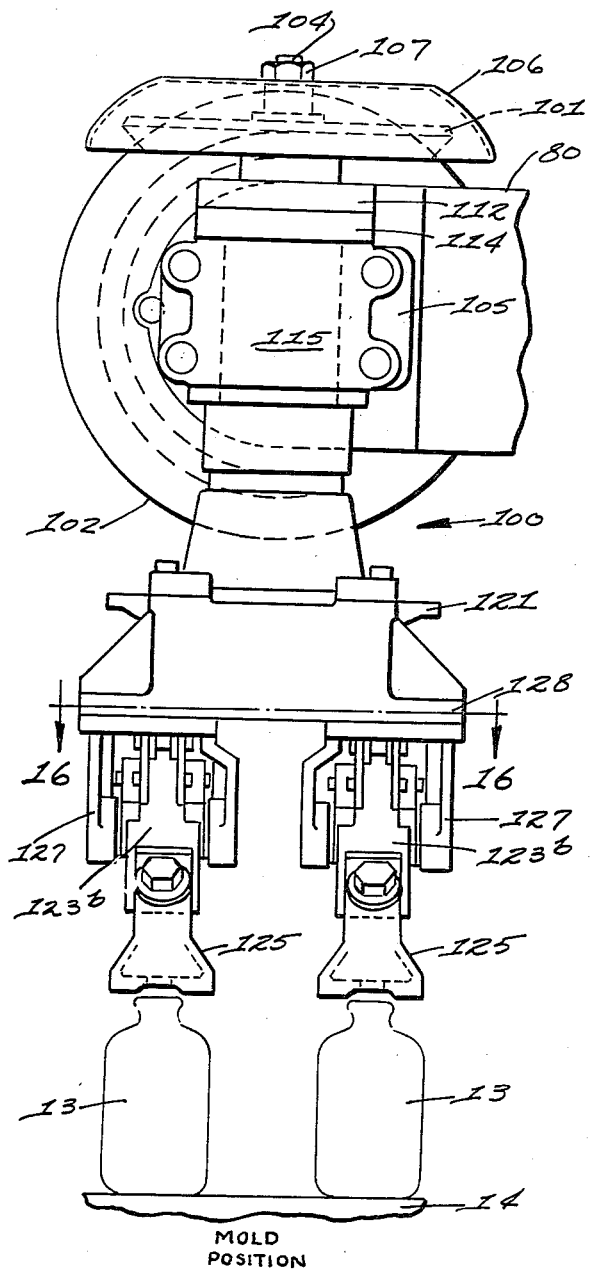
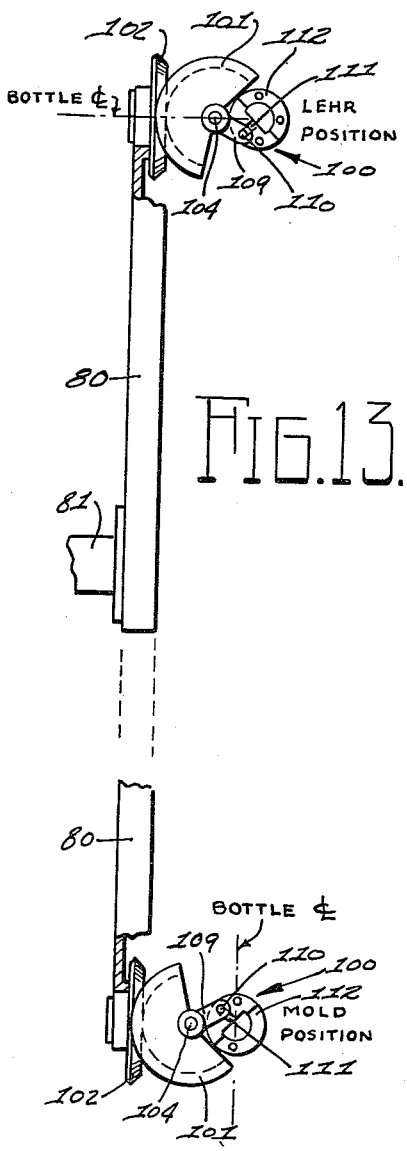
INVENTOR.
Guy H. Allgeyer
BY J. R. Nelson
+ W. A. Schaich
ATTORNEYS June 25, 1963
G. H. ALLGEYER
3,095,082
METHOD FOR HANDLING GLASSWARE ARTICLES
Original Filed June 5, 1958
12 Sheets-Sheet 8
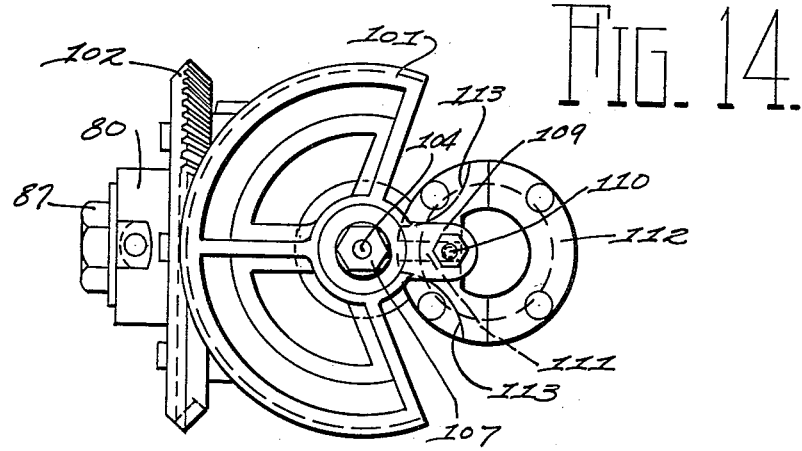
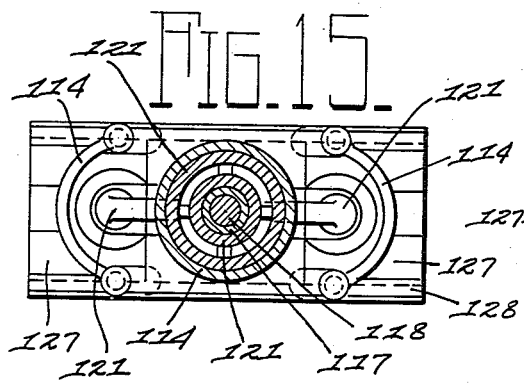
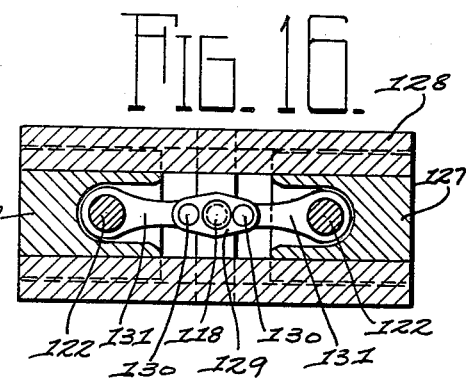
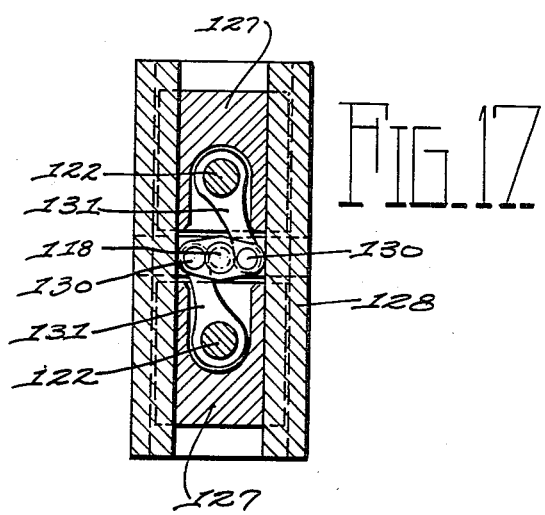
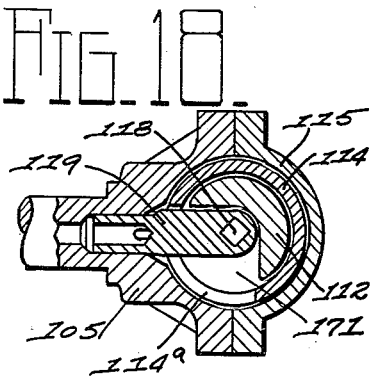
INVENTOR.
Guy H. Allgeyer
BY J.R. Nelson
+ W.A. Schurch
ATTORNEYS

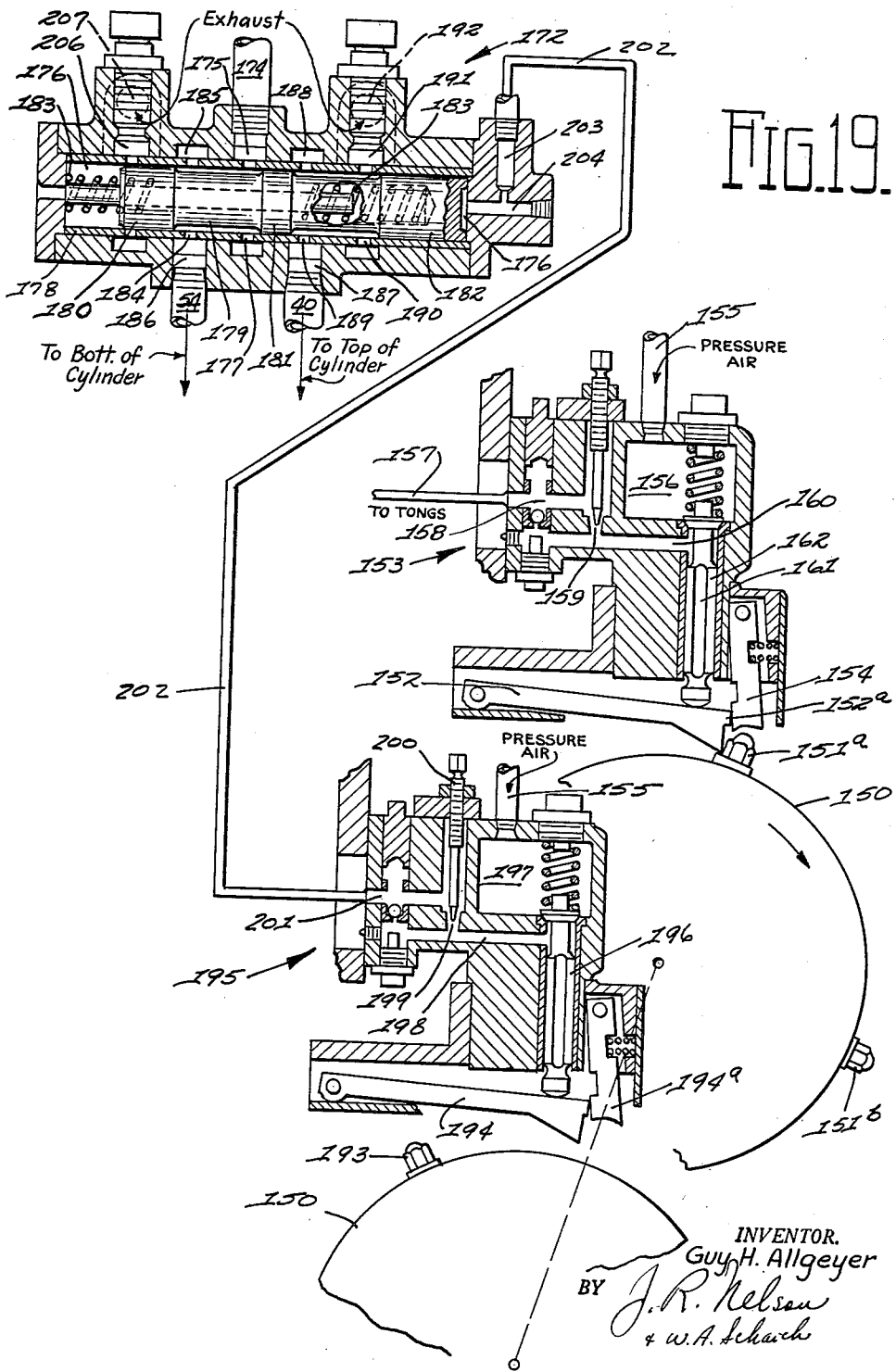

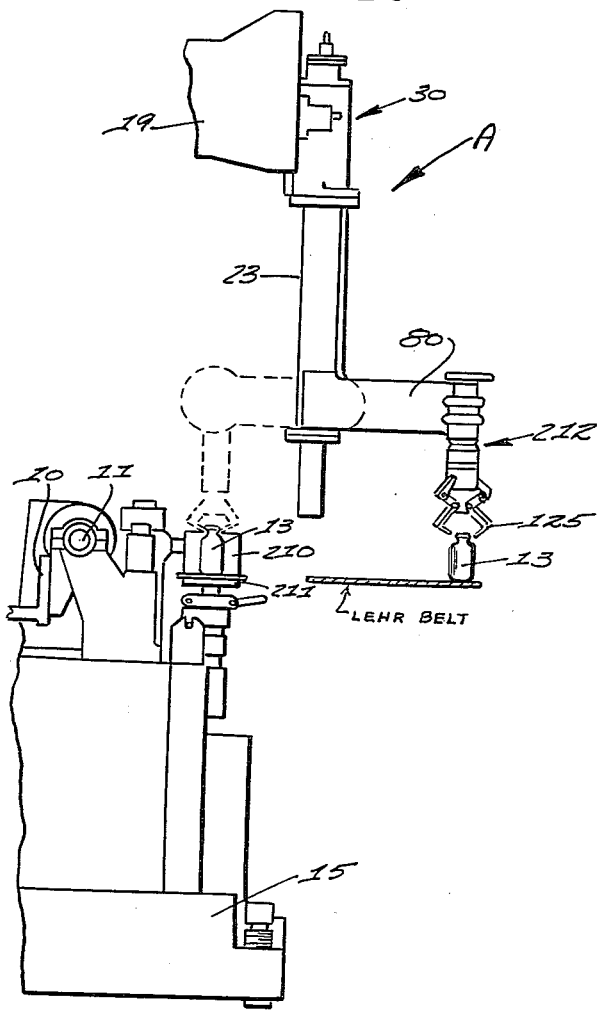
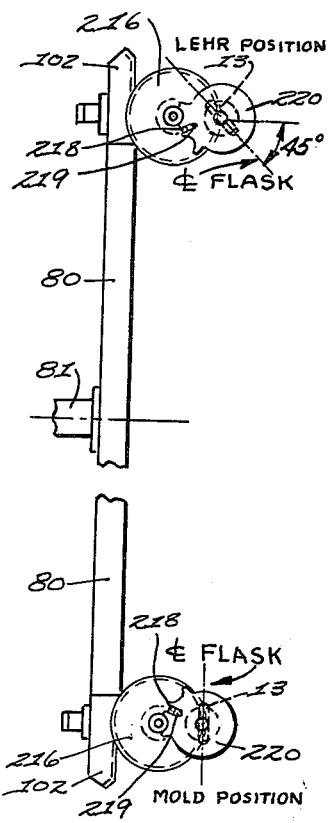

June 25, 1963
G. H. ALLGEYER
3,095,082
METHOD FOR HANDLING GLASSWARE ARTICLES
Original Filed June 5, 1958
12 Sheets-Sheet 11
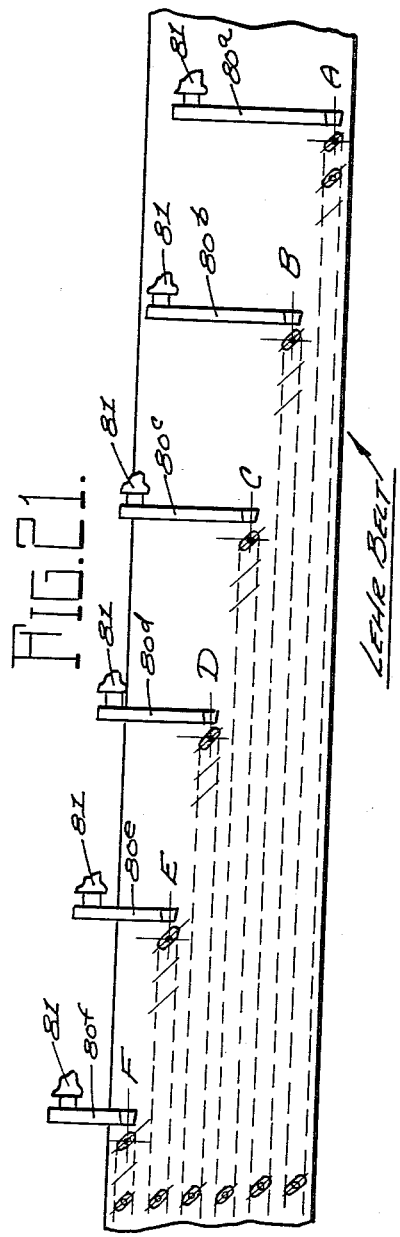
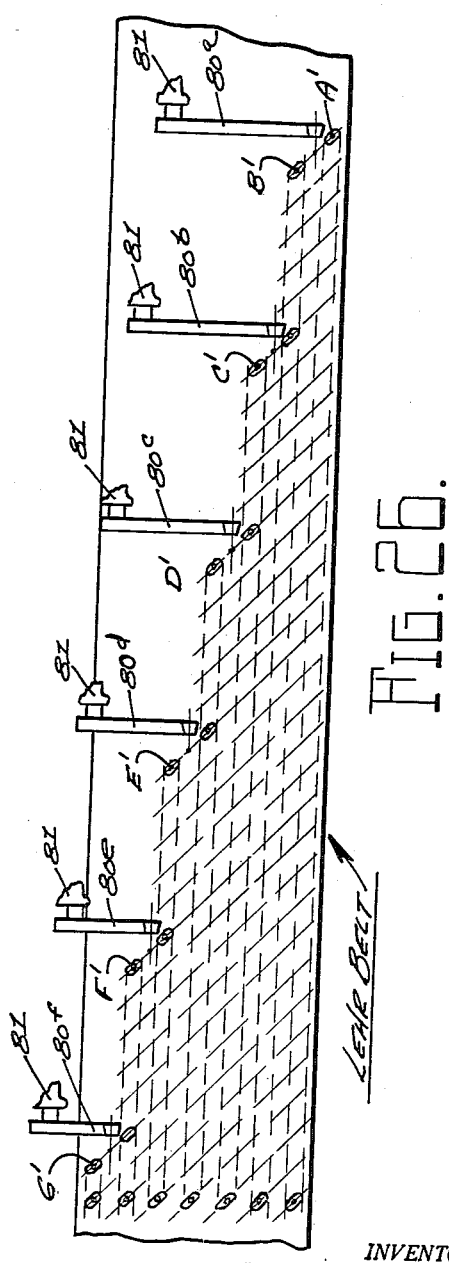
INVENTOR.
Guy H. Allgeyer
BY
J. R. Nelson
+ W. A. Schaich
ATTORNEYS June 25, 1963
G. H. ALLGEYER
3,095,082
METHOD FOR HANDLING GLASSWARE ARTICLES
Original Filed June 5, 1958
12 Sheets—Sheet 12
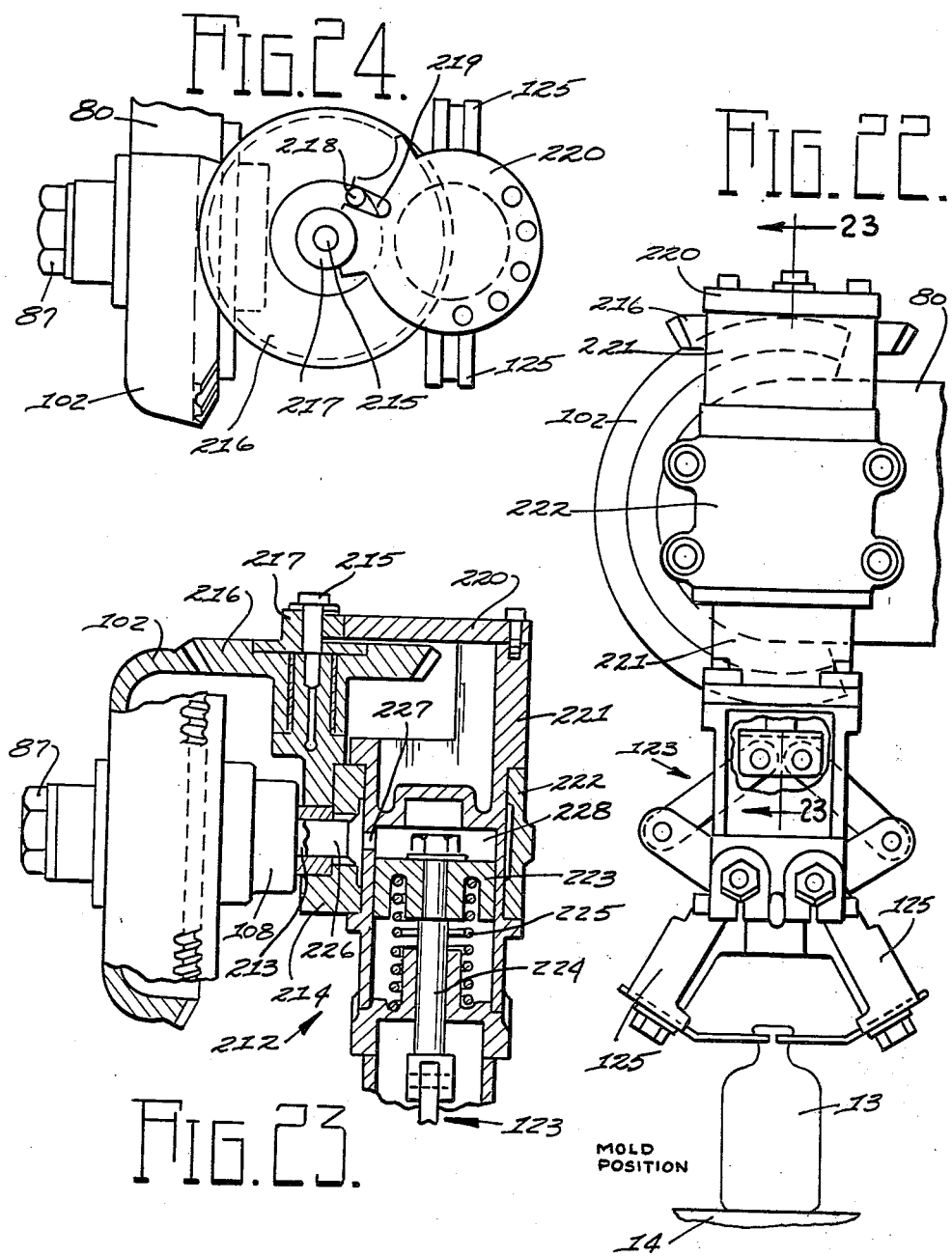
INVENTOR.
Guy H. Allgeyer
BY J. R. Nelson
+ W. A. Schaich
ATTORNEYS 3,095,082
METHOD FOR HANDLING GLASSWARE ARTICLES
Guy H. Aligeyer, Godfrey, Ill., assignor to Owens-Illinois Glass Company, a corporation of Ohio
Original application June 5, 1958, Ser. No. 740,020. Divided and this application June 15, 1959, Ser. No. 820,452
6 Claims. (Cl. 198—30)

The present invention relates to handling glassware articles formed by machine, and is more particularly related to new and improved method for transferring successively formed glassware articles from a receiving station, such as the finishing mold bottom plates of the machine, to a delivery station, such as a moving conveyor of a lehr, and depositing them thereon in a predetermined pattern and position of orientation.

The present application is a division of my copending application, Serial No. 740,020, filed June 5, 1958.

Hollow glassware articles, such as bottles, jars, tumblers and the like, generally are formed either in a single station automatic molding machine in which glass charges are directly pressed into finished articles, or in two station machines in which the charges are initially formed into parisons or blanks by either a press or blow operation and the parisons subsequently brought to within a finishing blow mold where they are subsequently reformed into finished articles. The articles may be formed successively one at a time, i.e. single gobbing; or in multiples, usually pairs, i.e. double gobbing. Generally, the finished articles must be transferred after the finishing molds are opened by means of take-out devices for permitting successive operation of the molding mechanism of the machine for forming other articles in the molds. The transfer from the mold is generally completed after the ware is deposited for cooling on a buck or dead-plate. The ware is thereafter transferred over one or more flights of conveyors for delivery to a lehr conveyor or other equipment for annealing.

The present invention provides for, and includes as one of its objects, a specific application in which formed ware is taken from the finishing mold of the machine and placed directly onto a moving conveyor belt which passes through the annealing equipment. Intermediate handling between the blow mold and the lehr conveyor is eliminated. This latter-mentioned method of annealing is disclosed more fully in the copending application of F. S. Wright, Serial No. 736,626, filed May 20, 1958, and owned by the assignee of this application. And during this transfer, the present invention provides for orienting each article of ware with respect to each other and with respect to the conveyor in a predetermined pattern and without interference with previously transferred ware.

In operation of modern day glass forming machines, such as the well-known Hartford-Empire "IS" machine hereinafter illustrated in connection with a specific example of the machine to which the invention is applicable, such machines are made up of a plurality of side-by-side sections in a bank or longitudinally aligned spaced apart group of ware forming mechanisms and each of these mechanisms are often operated for "double gobbing," that is the articles are molded successively in pairs. To obtain transfer from these forming mechanisms to a lehr conveyor traveling longitudinally along the side of the machine, the articles need be distributed laterally across the lehr in a plurality of rows to permit the lehr conveyor to travel at slow linear speeds consistent with satisfactory annealing practice, yet handling the ware in step with the machine without creating jam-ups. To accomplish this result, the present invention employs, and has as another of its objects, a transfer device to serve each ware forming mechanism in proper synchronism therewith for removing the ware from the mold as it is free to do so and placing it in a separate row on the lehr conveyor so that each of the rows will correspond to one of the ware forming mechanisms. Since, in double gobbing operation, the ware is formed in upright position in the mold and by pairs so that their central axes are vertical and spaced apart horizontally in a direction that is transverse to the path of movement of the conveyor, the position of the ware must be turned angularly so that their spaced axes are disposed parallel to or longitudinally along the path of the conveyor. This achieves two additional advantages, namely (1) all the ware in a given row on the lehr conveyor will originate solely from a single ware forming mechanism and upon detection of defects resulting from maladjustment of the ware forming mechanism will enable readily the proper adjustment of the mechanism, and (2) where irregularly shaped bottles or "panels" are being produced by the machine either in "single" gobbing" or "double gobbing" operation, they are disposed in finishing molds so that the major horizontal dimensions of the bottles are disposed in a direction that is transverse to the direction of the movement of the lehr conveyor, hence, the ware is placed on the conveyor surface in a position of maximum stability to prevent its upset by placing its major horizontal dimension longitudinally in relation to the direction of lehr conveyor movement. These latter-mentioned advantages point out two additional objects of the invention.

Another object of the invention as applied to "double gobbing" operation is to reduce the center distance initially defined by the mold when the ware is formed, this change in center distance occurring during transfer and to a practical minimum distance for the size of the ware involved to permit reducing the linear speed of the lehr conveyor to a minimum and consequently improve the efficiency of the annealing equipment.

It is also contemplated as an object of the present invention to place the regular shaped bottles in rows upon transfer from the molds so that their major horizontal dimensions are disposed obliquely with respect to the direction of movement of the lehr conveyor, so that, in the case of wide panels, space in the rows may be conserved and the spacing between the rows adjusted, whereby if upset of any bottle should occur in any of the rows it will not strike and upset any of the other bottles when it falls. This latter-mentioned feature is also especially applicable to small and thin panels which are relatively unstable.

Another object of the invention is to provide for a transfer of the ware successively from the finishing blow molds of multiple section forming machines and placing the ware in oriented relationship in a predetermined pattern on a lehr conveyor traveling past each of the forming sections. By depositing the ware onto a moving surface, it is especially important to place it on the conveyor so that it rests in an upright position and is oriented for maximum stability against upset in the direction of movement of the conveyor. This will tend to decrease to a minimum the chances of a botle in any one of the rows from upsetting and, by a "domino" effect, upsetting all of the ware in that row throughout the length of the lehr.

Another object of the invention is the provision of method for the transfer of articles of ware in pairs from their forming molds directly to the lehr conveyor, whereby the ware is rotated to a different angular position about a vertical axis parallel to the central axis of the ware and the pair of articles are shifted horizontally with respect to each other during transfer and deposited onto the lehr conveyor in an oriented position and into a pattern.

Other objects and advantages of the present invention will become apparent from a reading of the following description of various practical embodiments, the appended claims, and the accompanying drawings of these embodiments to which reference is made and in which:

FIG. 2 is a partial plan view showing the finishing mold end of a six-section "IS" machine, adapted for "double gobbing" operation, and includes an illustration of the method of the invention for orienting transferred glassware into a pattern of six rows on a lehr belt traveling along the side of the machine.

FIG. 3 is a sectional elevational view taken along line 3—3 of FIG. 1.

FIG. 4 is a sectional elevational view taken along line 4—4 of FIG. 3.

FIG. 5 is a sectional plan view taken along 5—5 of FIG. 1.

FIG. 6 is a side elevational view, partly broken away, and taken along line 6—6 of FIG. 5.

FIG. 7 is a sectional elevational view of the cylinder-piston drive motor mechanism of the transfer device of the invention.

FIG. 8 is a front elevational view, partly broken away, of the drive connection between the motor and the transfer arm for swinging the transfer arm of the transfer device about a horizontal axis and is illustrated as it would appear if viewed from the front of the forming machine from the lehr conveyor side (FIG. 2).

FIG. 9 is a plan view of the drive motor of FIG. 8 and illustrates the novel mounting for the motor on the overhead frame of the forming machine including the provision of vertical adjustment for the ware transfer device of this invention.

FIG. 19 is a sectional plan view, taken along line 10—10 of FIG. 7.

FIG. 11 is a front elevational view of the motor mounting on the frame of the forming machine and is projected from the plan view of FIG. 9.

FIG. 12 is a side elevation view of the transfer tongs for a "double gob" transfer device of the present invention, as viewed while at the mold position or the ware receiving station.

FIG. 13 is a schematic plan view showing the Geneva drive for rotating the bottle holding tongs during transfer, and illustrates schematically the two extreme positions of driving engagement of the Geneva drive during oscillatory transfer operation of the ware transfer device.

FIG. 14 is a plan view of the Geneva drive for rotating the ware handling tongs and is shown in the intermediate position which would be midway between two positions shown on FIG. 13.

FIG. 15 is a sectional plan view taken along line 15—15 of FIG. 3.

FIG. 16 is a sectional plan view taken along line 16—16 of FIG. 12. This view illustrates the mechanism utilized in the double gob transfer tong mechanism where it is desired to close the center between the ware during transfer from machine mold to the point of delivery, and is shown as it would exist under such circumstances at the mold position.

FIG. 17 is a sectional plan view taken along line 17—17 of FIG. 3 and shows the same center adjusting mechanism for double gob tongs mechanism referred to in connection with FIG. 16, but illustrates the center closing mechanism after the tong mechanism has been rotated through transfer from the mold position to the lehr conveyor position, the latter being the delivery station.

FIG. 18 is a sectional plan view taken along line 18—18 of FIG. 3.

FIG. 19 is in part, a schematic piping diagram showing the control valves for controlling the operation of the ware transfer device for effecting its swinging movement and its opening and closing movement of the ware gripping tongs, both in timed relation with the operation of the section of the "IS" machine on which the transfer device is being utilized.

Figure 1:
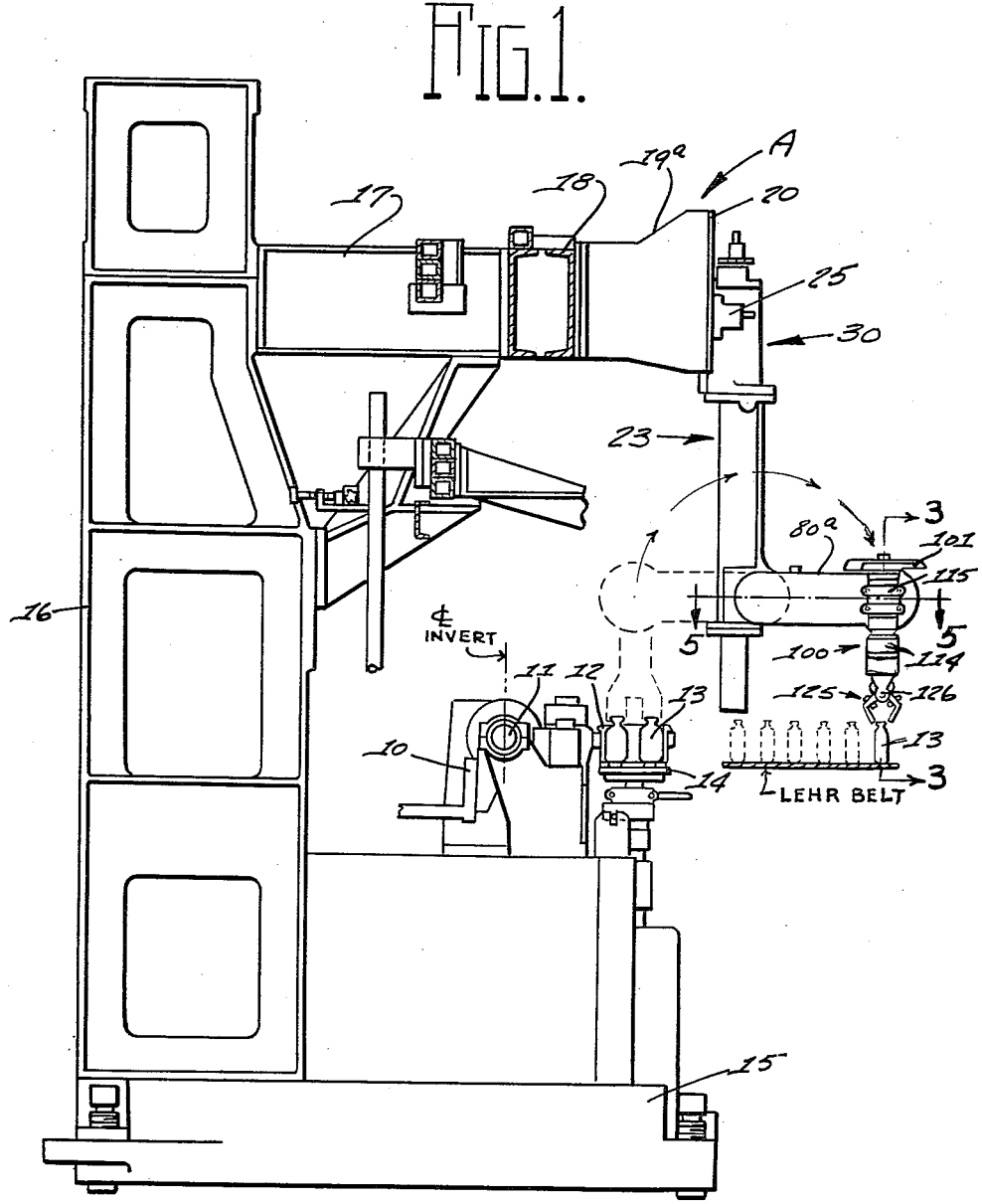
FIG. 1 is a side elevational view, partly in section, of one section of a well-known Hartford-Empire "IS" glass forming machine, and is taken along line 1—1 of FIG. 2 illustrating a specific embodiment of the method and apparatus of the invention.

FIG. 20 is a partial side elevational view, similar to FIG. 1, showing another embodiment of the invention in which the transfer device is being employed for transfer of the ware in "single gobbing" operation of the machine, the ware being rotated during transfer in a counterclockwise direction (as viewed from above) to displace its angular position by 45° from machine mold to its placement on the lehr conveyor.

FIG. 21 is a schematic plan view of the ware transfer according to the embodiment illustrated in FIG. 20.

FIG. 22 is a side elevational view of a single gob transfer device, shown at the mold position.

FIG. 23 is a partial vertical elevational view, partly in section, taken along line 23—23 on FIG. 22.

FIG. 24 is a plan view of the Geneva drive head corresponding to the position of the transfer device shown in FIG. 22, the Geneva wheel of the Geneva drive providing for 45° of rotation of the transfer tongs in one direction during transfer of the ware from the mold to the lehr conveyor according to the transfer pattern illustrated in FIG. 21.

FIG. 25 is a schematic view of the Geneva drive providing for 45° rotation of the tongs mechanism, and is shown in the two extreme positions of driving engagement during ware transfer.

FIG. 26 is a schematic plan view, and represents a third embodiment of the invention wherein a double gobbing transfer device is employed which is equipped with a Geneva drive for rotating the transfer tongs through a 45° counterclockwise angular displacement.

The present invention, in one novel form, is adapted to take formed ware from a finished blow mold of a forming machine, as herein illustrated, and put it directly onto a moving belt of a lehr conveyor which is arranged to travel past the molds and thence through an annealing lehr. This transfer is accomplished without intermediate handling of the ware. In the case of multiple section operation of forming machines, such as the Hartford-Empire "IS" type machine, which today is one of the widely used forms of machines in glass bottle plants, this lehr loading operation necessitates the performance of varrious functions for orienting the ware on the conveyor as well as providing the proper transfer, as is accordingly provided by this invention.

The bottles are brought in succession to the ware receiving position, which in the illustration hereinafter described comprises the mold bottom plates, and supported upright thereat ready for transfer. The articles are then grasped and held by transfer tongs and removed from the mold bottom plates in succession for transfer to a horizontally spaced receiving station, this station being herein illustrated as a moving lehr conveyor. This transfer requires both vertical and horizontal movement to clear the mold without interference and to perform the transfer. During the transfer, the ware is held upright and rotated about its vertical axis to turn it to an orienting position for delivery. This rotation becomes necessary if the machine is operating for double gobbing or if the machine is producing irregularly shaped articles of ware such as "panels" by either single or double gobbing operation. In the case of irregularly shaped ware, it is placed in a line or row with the greater dimension along the direction of movement of the conveyor to promote maximum were stability. This is especially significant where small "panels" are involved, because the stability of the ware upon delivery to the moving lehr conveyor will be a very important factor contributing towards the successful operation of a direct transfer from machine mold to the lehr. Also, efficient organization of the rows of the ware being transferred from the various sections of a multiple section machine is important to prevent upset, because if an article of ware is upset, upsetting of ware will sweep the entire row throughout the length of the lehr; yet the ware need be loaded compactly to permit utilization of slow lehr belt speeds. Prior to release of the ware to the lehr, it is also oriented with respect to other ware being placed in a single row, such as, in the case of double gobbing operation, closing the center distance between the ware during transfer by horizontal movement toward each other and prior to placement on the conveyor at delivery.

The method of the present invention will be more apparent from the following description of the apparatus and its mechanical aspects, as illustrated on the drawings just referred to. On the drawings, FIGS. 1 and 2 illustrate one working form of the apparatus of the present invention being employed on a six-section "IS" machine, each section having a ware forming mechanism designated by reference letters A through F on FIG. 2. Forming mechanism A is shown in FIG. 1 and represents the end mechanism of the six-section machine of FIG. 2. Each of the forming mechanisms comprises a gob delivery mechanism, a blank mold, and cooperating neck ring, none of these being shown but may be readily understood by reference to U.S. Patent No. 1,911,119, issued to H. W. Ingle. The neck ring is carried on an invert mechanism 10 which is pivoted sequentially about a pivot 11 to successively bring the blank or parison shapes of glass to the final blow molds 12. The blow molds 12 are operated to open and close and form finished containers 13. The formed containers are supported on mold bottom plates 14 in an upright position so that their central axes are vertical. Each of the six sections of the "IS" machine, as illustrated in FIGS. 1 and 2, are equipped for double gobbing operation.

The forming machine includes a base 15 on which the ware forming mechanisms A–E are supported. The machine has a pair of vertical end frame structures 16 connected to the base 15. Appended to the vertical frame 16 are horizontal brackets 17 which support a longitudinally disposed overhead beam or frame member 18, the latter being parallel to the longitudinal alignment of the finishing molds 12 of the six forming mechanisms of the machine. Opposite and overlying each of the forming mechanisms A–F is a corresponding bracket member, designated on FIG. 2 by reference numerals 19a through 19f. The bracket members vary in length one from the other so that they extend horizontally and longitudinally from the overhead frame 18 at varying distances. In the example shown on the drawings, they are arranged to vary in length progressively from one longitudinal end of the machine to the other so that their outer ends are in a staggered alignment.

At the outer end of each bracket member is an adjustable mounting for attaching a glassware transfer device, which will be later described in detail herein. Each mounting is constructed similarly, and hence, will be referred to herein by the same reference number. At the outer end of each bracket member, for example, bracket 19a (FIG. 1) is a vertical slideway 20 rigidly connected thereto (see FIGS. 7, 9, and 11). The slideway 20 provides opposed grooves 21 which receive T-slides 22 integrally connected with a vertical frame casting 23 of the transfer device. The frame 23 is integrally connected with the cylinder-piston motor of the transfer device, and will be presently described hereinafter. As seen on FIGS. 9 and 11, a threaded boss 24 is integrally connected to the vertical frame casting 23 of the transfer device and has its threaded central bore 24a vertically disposed and parallel to the slideway 20. A lug 25 is integrally connected with the slideway 20 on bracket 19 so as to be stationary. Lug 25 has a vertical bore 25a which receives a threaded shaft 26, the upper end of shaft 26 being threaded through the threaded portion 24a of boss 24. A pinion 27 is keyed onto the lower end of shaft 26 and is in mesh with a worm gear 28 fixed on a shaft or pivot 29 of lug 25. The vertical position of the transfer device is adjusted by turning shaft 29 and worm gear 28 in the appropriate direction. This will raise or lower the entire transfer device within the vertical slideway 20.

Referring again to FIG. 1, each transfer device is made up of a vertical frame casting 23, as just mentioned, and integrally connected as a part of this frame is the cylinder piston motor designated generally at reference numeral 30. This motor is shown in detail on FIG. 7 and comprises a cylinder 31 having a head-end casting 32a and a bottom-end casting 32b which close the opposite ends of the cylinder. In the head-end of cylinder 31 is an adjustable head-end member 33 having an upstanding shaft portion 34 journaled in a bearing 35 which is part of the head-end casting 32a. The end shaft 34 is threaded and held in position by a collar 36 having matching threads engaged on the outer end portion of the shaft 34. The head-end member 33 has piston rings 37 which maintain the inner operating portion of cylinder 37 fluid-tight. The vertical adjustment of head-end member 33 is accomplished by turning collar 36 in the proper direction. This will either cause the head-end member 33 to be raised or lowered and serves to adjust the operating length of the cylinder 31. Between the head-end casting 32a and head-end member 33 is a fluid chamber 38 which communicates with the cylinder port 39. Port 39 is threaded to connect fluid conduit 40 which is part of a pressure fluid system to be later described herein.

The motor 30 includes a piston 41 in the cylinder and has a downwardly extending piston rod 42. The piston rod 42 extends through a fluid-tight gland 43 in the bottom-end casting 32b of the cylinder and at its lower end portion has an integrally connected rack segment 44. At the opposite end of the piston 41 is a tapered pin 45 concentric with piston rod 42. The head-end member 33 has a cylindrical bore 46 which registers with the tapered pin 45, the diameter of the bore being just slightly greater than the largest diameter of the pin. The innermost end of the cylindrical bore 46 is connected to chamber 38 by a radial passage 47. Another fluid passage 48 is formed in the head-end member 33 and extends from within the cylinder to a needle valve chamber 49. An axially disposed needle valve 50 is threaded for adjustment in the upper shaft portion 34 of the head-end member 33 and is turned by its outer head-end 50a. The needle valve 50 may be adjusted with respect to its seat in the needle valve chamber 49. The upper end of this chamber communicates with a radial slot 51 and slot 51 connects with chamber 38 through the annular space 52. A one-way ball-type check valve assembly 53 is provided in the head-end member 33 to permit only incoming flow of pressure fluid to the cylinder.

The bottom-end of the motor is connected to the fluid pressure system by conduit 54 connected to radial cylinder port 55. This port 55 is positioned axially from the bottom-end of the cylinder by a distance less than the axial dimension of the piston 41 so that when the piston approaches its lowermost position during its downward stroke, the port 55 will be closed. Port 55 also connects to the cylinder through a vertical passage 56 which communicates with a horizontal passage 57 connected to a cylindrical valve chamber 58. Thus, when the piston closes radial port 55, passages 56 and 57 together with the port 55 form a fluid connecting means between the valve chamber and the fluid pressure line 54. As seen on FIG. 10, the valve chamber 58 houses a cylindrical fixed member 59 which fits snugly therein and is held in position by the threaded cap 60 screwed into thread 61 in the bottom-end casting 32a of the cylinder. The innermost end portion of the fixed member 59 divides the valve chamber into two parts and a passage 62 is provided through this inner end of member 59 to connect these parts of the chamber. A cylindrical member 63 is mounted inside the sleeve portion of member 59 for limited axial sliding movement between extended and retracted positions. The movable member 63 is held in its extended position (as shown on FIG. 10) by compressed coil spring 64. The movable member has an axial passage 65 with an outlet 66 in register with a bore 67 through the side of the fixed member 59, the bore 67 communicating with the horizontal passage 57. An adjustable needle valve 68 is threaded through the cap 60 and is positioned to restrict the flow of fluid through the axial passage in the movable member 63 while the latter is held in its extended position. A bottom fluid port 69 in the cylinder 31 is connected to the end of the valve chamber 58 opposite passage 57.

Near the lower end of the frame 23 of the transfer device is a horizontal shaft 70 (see FIGS. 5, 7, and 8). Shaft 70 has a squared end portion 71 and a wrench 72 fitted onto the squared portion 71. The outer end of shaft 70 is threaded and a nut 73 holds the wrench in place. The wrench 72 has a handle 72a with an arcuate slot 74. The slot 74 aligns with the casting 75 which is threaded to receive a bolt 76. The bolt 76, when inserted through the slot 74 and tightened in the casting 75, attaches the wrench 72 rigidly to vertical frame 23 of the transfer device. This provides for maintaining the shaft 70 in a fixed position. The shaft is housed in the frame 23 in a bushing 77 and this bushing is dovetailed in the frame 23 to maintain the axial positioning of the shaft. A pinion gear 78 is connected to a drive bushing 83 journaled about shaft 70. The pinion gear 78 is in mesh with the teeth of the rack segment 44 on the piston rod of the motor 30 and is driven in either direction by the vertical reciprocating motion of the rack gear 44. The pinion gear 78 is bolted integral with the arm casting 80 of the transfer device at its hub 81 by bolt 78a and pin 78b so that rotation of gear 78 carries the arm 80 with it.

As indicated on FIGS. 1 and 2, the arm 80 on each of the transfer devices is a different length, and accordingly the arms are numbered as 80a through 80f to correlate them with the respective forming mechanisms A–F which they serve. However, since the arms are all of similar construction, except for their length, the description of the transfer arm on FIGS. 5 and 6 will be applicable to each of the arms and is referred to generally as 80.

The arm 80 has an integral hub 81 which is connected to the pinion gear 78, as mentioned, for rotation with the latter. A bore 82 is provided in the hub for housing a bushing 83 which is rotatable with the hub. At the end of shaft 70, which extends beyond the bushing 83, is mounted a spur gear 84 which is rotatable only by the wrench 72 through shaft 70. At the outer end of arm 80 is a horizontal shaft 85 mounted in the bearing assembly 86 and bolted in position by nut 87. A spur gear 88 is keyed to the shaft 85. The spur gears 84 and 88 are connected by a link chain 89 which is reeved in endless fashion and adjusted for tightness by idler member 90. Hence, the two shafts 70 and 85, through the connection of chain 89, are held in fixed rotatable positions one to the other and perform the function of maintaining the tongs mechanism in a vertical position during swinging movement of the transfer arm 80, as will be presently described.

Referring now to FIGS. 3 and 4, a tongs mechanism 100 (see FIG. 1) is mounted at the outer end of the transfer arm of each of the transfer devices. The upper part of the tongs mechanism 100 includes a Geneva drive unit comprising a bevel-gear Geneva driver 101 in mesh with a beveled gear tooth element or segment 102 rigidly held on the outer end of the transfer arm 80 by studs 103. The Geneva driver 101 is pivoted on a vertical shaft 104 which is an integral part of casting 105. The shafts 104 and 85 are each integral parts of casting 105. A protective covering plate 106 is attached to the outside of the arm 80 and fastened to shaft 104 by lock nuts 107. The shaft 85 is also journaled through a bearing in spider casting 108 bolted to the arm 80.

Referring for the moment to FIG. 14, the Geneva-driver gear 101, as seen in plan, includes an arm segment 109. This arm segment is provided with a vertical driver pin 110 which is adapted to engage in a slot 111 in the upper hub assembly 112 of the tongs mechanism when the driver gear 101 is rotated toward the slot. The combination of the driver 101, arm 109, pin 110, and slot 111 in the hub 112 comprises a single indexing station of a 90° or four-station Geneva drive mechanism which, when operated, will impart 90° of rotation to the hub 112. After the hub has turned through 90° of rotation, it is stopped and held in place by the contoured portion 113 thereof matching with the circular contour at the lower portion of the shaft 104. The hub is held in that position until the pin is again engaged with the slot upon rotation of the driver gear in the other direction.

Referring again to FIG. 3, the hub 112 is rigidly connected and inserted within a cylindrical holder sleeve 114. This holder sleeve 114 is trunnion mounted to the casting 105 by a connector bearing 115 (more clearly shown on FIG. 12). The combination between the hub 112 inserted in the sleeve 114 defines the head-on portion of a single acting cylinder-piston motor, the piston 116 being in the lower portion of the sleeve 114. The piston rod 117 of piston 116 in hollow and accommodates a rod 118. Rod 118 has a square end portion which extends through a wrench lever 119. The wrench lever is rigidly held with the casting 105, and bolted onto the squared end of rod 118 by nut 120. The lower end of piston rod 117 carries a double-cross head 121 (see also FIG. 15). Both sides of cross-head 121 are in engagement with the depressable pins 122 connected to toggle link assembly 123. The upper two links 123a of toggle assembly 123 are pin connected at the lower end of rod 122, and the lower links 123b of the toggle are connected to the respective halves of tongs 125. The tongs 125 and the lower links 123b pivot about shaft 126. Each shaft 126 is journaled through the lower end of the tong slide 127. As seen in FIG. 4, each of two tong slides 127 receive tongues 128 which are bolted to holder sleeve 114.

With reference to FIGS. 16–18, the lower end of rod 118 is connected to a slider crank mechanism. The rod 118 is fixed and has a non-rotating crank 129 carrying a pair of crank pins 130 spaced apart 180°. The crank pins are connected by links 131 and each link fits around the rod 122 of the tongs mechanism. The tong slides 127 being slidable along the tongues 128 comprise the cross-head or slider in the crank mechanism. In operation of the tongs mechanism 100, as the Geneva drive rotates the tongs holder sleeve 114 90° about the fixed rod 118, the tongs holder 114 carries the tong slides 127 with it thereby causing the tong slides to have their center distance either increased or decreased depending upon the starting position of the sleeve holder 114 relative to the fixed rod 118. In the contemplated use herein illustrated, the tongs mechanism is assembled and constructed to decrease the ware center distance during swinging movement of the transfer arm 80 from the mold position to the lehr position. However, by a simple change in the position of the crank arms, the ware center distance may be made to be increased during transfer arm movement from mold to lehr. FIG. 16 illustrates the position of the slider-crank mechanism when the tongs mechanism is at the mold position (FIG. 12). FIG. 17 shows the position of the slider-crank mechanism when the tongs mechanism is transferred to the lehr position for delivery of the ware (FIG. 3).

FIG. 18 shows the relationship of the lever 119 and the squared end connection on the rod 118 for holding the rod 118 in a fixed or non-rotatable position. The slotted portion 114a of the holder sleeve 114 permits 90° of rotation of the sleeve with respect to lever 119.

The tongs 125, which operate in opposed pairs to open and close about the necks of ware 13 (FIGS. 3 and 4), are normally held in their open position by coil springs 132 compressed between retainer washers 133 and a shoulder on the tong slides 127. Thus, when the piston 116 of the tongs cylinder-piston motor is in its upper position, the piston rod 117 holds the cross-head 121 retracted and springs 132 force rod 122 upwardly. As may be seen on FIG. 4, with the rod 122 drawn upwardly, the upper links 123a are pulled upwardly and pivot the lower links 123b towards each other. These lower links 123b are connected to a respective tong half of the tong pairs 125 and at the same side of the center line of rod 122 of that particular link. When the tongs 125 are to be closed and gripped about the neck of bottle 13 (FIG. 3), piston 116 is forced downwardly by the introduction of pressure fluid, as will be hereinafter described, and the hollow piston rod 117 slides along rod 118 and drives cross-head 121 downwardly against the force of the springs 132 and drives the rods 122 in that direction. This rotates the toggle links 123 about their pivots to close each of the pairs of tongs 125 about the necks of the ware 13.

Having just described the mechanical aspects of the various parts of the transfer device of this invention, the fluid circuit and controls for actuating the transfer arm and the tongs mechanism will now be described.

With particular reference to FIG. 19 and occasional cross-reference to FIGS. 3, 5, 7, and 10, it is seen that reference numeral 150 designates the rotatable timing drum of the timing device of the "IS" forming machine. The drum 150 is driven in one direction of rotation and at a constant speed to actuate various poppet type valves that regulate the forming cycle of the glass forming mechanism of the machine. In the present invention, one position on the "IS" timing drum 150 is utilized to mount buttons 151a and 151b which are rotated in alignment with a valve control lever 152 of a tong operating valve, referred to generally as 153. Valve 153, as shown, is a standard poppet-type valve mechanism used for controlling other operations on the "IS" machine, and briefly described comprises a fluid connection 155 from a source of fluid under pressure to a pressure chamber 156. As shown, the valve is positioned for exhaust of fluid from the tongs mechanism through a circuit, to be presently described, and into a fluid line 157, thence through a passage 158 past a needle valve opening 159, into a passage 160 and through a groove 161 in the valve member 162 and exhaust to atmosphere. After sufficient rotation of the timing drum 150, the "low" valve button 151b engages the lower side of valve lever 152 which forces the lever upwardly and its end portion 152b engages the spring loaded latch 154 so that the lever is held in the "up" position and valve member 161 is lifted from its seat in chamber 156. The fluid pressure is then transmitted through the valve and into conduit 157 leading to the cylinder of the tongs motor. The pressure is kept on until the "high" valve button 151a advances to engage and lift the valve lever 152 and unlatch it from the latch 154, whereupon the valve member 161 is set by spring force to again exhaust fluid from the tongs motor.

Conduit 157 makes a fluid connection to the tongs by its connection to the hollow chamber 163 drilled centrally in shaft 70 (FIG. 5). Shaft 70 is radially bored at 164 and has an annular spacing 165 which communicates with an opening 166 through bushing 83 and then connects to a fluid line 167. Passage 167 connects to a drilled central passage 168 in shaft 85 by a radial port 168a and an annular end portion of passage 167 around shaft 85. The passage 168 then extends to the edge of the casting 105 of tongs mechanism 100 (FIG. 3). The fluid is there conducted into a chamber 169 above piston 116 of the tongs mechanism 100 for operating the piston within the cylinder chamber of the sleeve holder 114. When the pressure is connected by the valve 153 to the line 157 the piston 116 is driven in a direction to close the ware holding tongs 125. On the other hand, when the valve 153 is set to exhaust, air is conducted from the chamber 168 above piston 116 through the described fluid passages and exhausted through the valve 153. Thus, the tongs mechanism is positively controlled to close under pressure by a separate valve mechanism, namely the tong operating valve 153. As mentioned above, the tongs are opened under spring pressure and close under fluid pressure, therefore a failure in the pressure circuit while operating the tongs during transfer will automatically actuate the tongs to "open" position and release the ware, thereafter eliminating interference upon successive transfer movements.

The motor 30 (FIG. 7) which drives the transfer arm 80 through its swinging movement is operated under the controlled fluid-actuated valve 172. A valve 172 for each drive motor 30 of the transfer devices corresponding to the machine sections A–F is mounted on the overhead frame 18 on the machine (FIG. 2). The valves each receive pressure fluid from a supply manifold 173 through individual conduits 174 between the manifold and the valve inlet 175 (FIG. 19). The inlet 175 communicates with the cylindrical valve chamber 176 through openings 177 in the valve sleeve 178 which is inserted in the valve chamber. A hollow valve spool 179 is housed in valve chamber 176 and is axially shiftable in sleeve 178. The valve spool 179 has three axially disposed annular lands 180, 181, and 182, reading left to right on FIG. 19. A coil spring 183 is housed in the hollow core of valve spool 179 and compressed between the innermost end of the core and the end wall of the valve chamber. The spring 183 sets the valve spool 179 to its righthand position on FIG. 19 so that fluid pressure from line 174 enters the valve chamber 176 and is distributed therein between lands 180 and 181. The pressure fluid passes through openings 184 in valve sleeve 178 and into annular passage 185. The annular passage 185 communicates with cylinder port 186 of the valve and at this setting introduces pressure fluid to conduit 54. Conduit 54 is connected to the radial port 55 (FIG. 7) near the bottom end of the cylinder of motor 30.

The valve 172 being spring set to this position normally connects motor 30 to the pressure fluid in the line 174 when piston 41 is in its lowered position at the bottom end of cylinder 31 (dotted outline in FIG. 7). The fluid enters port 55 and, since the piston blocks this port to the cylinder, the fluid is conducted through passages 56 and 57, and enters valve chamber 58 through openings 66 and 67 (FIG. 10). The pressure shifts the movable member 63 of the valve to its retracted position against spring 64 and unseats the needle 68 from passage 65. The pressure is then conducted through the bottom end port 69 of the cylinder to drive the piston 41 upwardly (FIG. 7). Movement of the piston in this direction will drive the pinion gear 78 in a clockwise direction on FIG. 7 and swing the arm 80 of the transfer device in the same direction. For example on FIG. 1, transfer arm 80a will be swung from its position over the molds 12 at the ware receiving station to a position approximately 180° in the clockwise direction and over the lehr belt at the ware delivery station.

As piston 41 is moved toward the head-end of the cylinder 31, fluid above the piston is freely exhausted through bore 46 in the head-end member 33, passage 47, cylinder port 39 and conduit 40. Conduit 40 extends to a connection with valve port 187 which communicates with an annular chamber 188 in the valve 172 (FIG. 19). Chamber 188 is connected to the main valve chamber 176 through openings 189 in sleeve 178. The exhausted fluid is conducted between lands 181 and 182 of the valve spool and enters openings 190 connected with an annular exhaust chamber 191 connected to an exhaust port 192.

During the initial part of the piston movement the pressure fluid introduced through bottom port 69 (FIG. 7) accelerates the piston gradually so that the ware is gradually lifted from the mold bottom plates 14 (FIG. 1), but after the piston uncovers radial port 55 of the cylinder (FIG. 7), its movement is accelerated relatively rapidly while driving the transfer arm 80 through the major portion of its swinging movement. Fluid above the piston is freely exhaust through bore 46 in the cylinder head-end member 33. But, near the end of the stroke, the arm is gradually brought to rest over the delivery station as follows.

The tapered pin 45 begins its entry into bore 46 and initiates a restriction of the exhaust of fluid. As the pin progresses farther into the bore, restriction of the exhaust is progressively increased until it is shut-off completely. Exhaust fluid must then be conducted through passage 48, but this flow is restricted by the adjustment of needle valve 50 in its seat 49. Near the end of the stroke, all of the exhaust must be through passage 48 regulated by needle valve 49—50. This cushions the ware transfer and permits the ware to be delivered gently to the lehr conveyor.

Referring again to FIG. 19, the motor valve 172 is shifted to an alternate setting for driving the piston of motor 30 downwardly (FIG. 7) by fluid pressure. With the piston driven to the head-end of the cylinder of motor 30, the transfer arm 80 is at the delivery station over the lehr. After the forming mechanism of the machine has formed the next pair of bottles 13, the button 193 on the timing drum 150 will engage the valve lever 194 of the pilot valve 195. Pilot valve 195 is a poppet-type valve similar to the tong operating valve 153. The lever 194 will force the valve member 196 upwardly and connect pressure fluid in chamber 197 to passage 198. The lever 194 is latched in this position by the spring loaded latch 194a. The fluid is conducted through the passage 199 regulated by needle 200, then into passage 201 and conduit 202 connected to pilot port 203 of valve 172. Port 203 connects with an axial passage 204 opening into the righthand end of the valve chamber 176. The pilot pressure forces the valve spool 179 to the left in FIG. 7 against spring 183 and lands 181 and 182 then connect main pressure fluid from line 174, port 175 and openings 177 to opening 189, annular chamber 188, port 187 and conduit 40. Land 182 of the valve spool blocks openings 190 in the sleeve 178 and blocks exhaust from conduit 40.

Conduit 40 is connected to the upper cylinder port 39 (FIG. 7). Fluid pressure acts on the upper end of piston 41 to move it downwardly and swing the transfer arm 80 in the counterclockwise direction (FIG. 1). Fluid is exhausted from below the piston 41 (FIG. 7) through the radial cylinder port 55, conduit 54, valve port 186 (FIG. 19), annular chamber 185, openings 184 and into valve chamber 176 between lands 180 and 181 on valve spool 179. With the valve spool shifted to the left, the openings 205 in sleeve 178 are uncovered between these lands and fluid is exhausted from the valve through the communicating annular chamber 206 and exhaust port 207.

After relatively slow initial movement of piston 41 in this direction, the tapered pin 45 clears bore 46 (FIG. 7) and movement is accelerated downwardly until the piston covers the radial port 55. At this point the stroke is cushioned by gradually stopping it at the bottom end of the cylinder, since all fluid below the piston must necessarily be exhausted through the bottom-end cylinder port 69. As seen in FIG. 10, this flow of exhaust fluid is restricted by needle valve 68 set in passage 65, because flow is assisting spring 64 to place the movable member 63 of the valve in its extended position to establish the restriction. The exhausted fluid is thus metered to passages 57, 56, and 55 and into conduit 54 for exhaust through motor valve 172, as described.

One important safety feature of the invention is the spring loading of the motor valve for setting it in position to actuate the piston upwardly. If the pilot pressure or pilot valve should fail during operation, the valve will automatically set to return the transfer arm and its associated tongs mechanism over the lehr belt and out of possible interference with the machine molds and related mechanism, such as the invert arm 10. As previously mentioned, such failure of pressure will also cause the tongs to be kept open.

In setting up the transfer device for operation with a particular size of ware, the vertical height adjustment is made by the worm gear 28 (FIGS. 9 and 11) to adjust each device vertically in their vertical slideways on the various brackets 19a–19f. This is done when the transfer arm 80 and the tongs mechanism thereof are over the mold position (dotted outline in FIG. 1). Sample ware of proper size may be used to make this adjustment. The proper height over the lehr belt may be adjusted by swinging the arm and tongs mechanism over the lehr belt (solid outline in FIG. 1) and in that position adjust the stroke of the motor 30 by adjusting the movable cylinder head-end member 33 of the motor cylinder (FIG. 7) by appropriate turning adjustment of threaded collar 36. If the head-end member 33 is moved downwardly into the cylinder, the bottle position for delivery at the lehr belt will be raised. Moving the head-end member upwardly in the cylinder will result in delivery of the bottle at a lower elevation. Larger ware may obviously be dropped a further distance at release to the lehr belt than smaller ware, but this vertical releasing distance should be kept at a minimum.

During operation of the transfer device through swinging movement of the transfer arm 80, the tongs mechanism 100 is kept in an upright position. This is accomplished by the chain 89 connecting the gears 84 and 88 together (FIGS. 5 and 6). Since these gears are connected onto the horizontal shafts 70 and 85, the two shafts are prevented from rotating with respect to each other. The shaft 70, as mentioned, is locked to the frame of the transfer device by the bolted connection on wrench 72 (FIG. 8). To adjust the position of the tongs mechanism to vertical, the wrench 72 may be loosened at its bolted connection 75—76 and rotated manually to the proper setting and then the bolt 76 retightened to retain that adjustment. Rotation of the wrench also rotates shaft 70, and gear 84, which in turn rotates gear 88 and shaft 85 through chain 89. Since the casting 105 of the tongs mechanism (FIG. 3) is integral with shaft 85, it receives the adjustment.

The different techniques of ware transfer are illustrated on the drawings, one of which is shown on FIGS. 1 and 2. The ware 13 is formed in pairs and supported on mold bottom plates 14. The transfer arm 80 is swung into a position over the molds and the two pairs of tongs are registered about the necks of the ware and closed by the operation of the tongs motor, described above. The arm 80 is then swung towards the lehr belt position and during this movement the bevel gear element 102 on the arm drives the matching teeth on the Geneva driver gear 101 on the tongs mechanism. FIG. 13 shows the centerline relationship of the ware as it leaves the mold position. And after the arm rotates enough to clear the molds 12, the Geneva driver 101 is rotated clockwise sufficiently for its pin 110 carried outwardly on its arm segment 109 to engage in the slot 111 of the Geneva wheel or hub 112 (see lower portion of FIG. 13). During the swinging movement of arm 80, rotation of the Geneva driver 101 is continued in the clockwise direction and advances the angular position of hub 112 by 90° in the counterclockwise direction. This turns the bottle centerline through 90° so that the bottles arrive over the lehr belt aligned longitudinally in a single row along the path of movement of the belt. This rotation is completed before the end of the swinging movement of the arm and before the ware is released (see upper portion of FIG. 13). During the 90° rotation of the ware, the pair of articles being transferred are moved toward each other so as to close their spacing upon delivery to the lehr conveyor. This function was previously described herein in detail in connection with FIG. 3.

As seen by reference to FIG. 2, successive transfer operation of the six transfer devices between the forming mechanisms A–F and the lehr belt, according to the above described procedure, forms six rows of bottles distributed laterally across the lehr belt.

It should also be noted, that in the case of transfer of "panels," as is illustrated in FIGS. 1 and 2, the ware is delivered in its most stable position, whereby the major horizontal dimension of the ware is parallel to the direction of travel. Hence, any jerks or irregular rate of movement of the lehr belt will have less of a tendency to upset any article of ware in the direction of the row so as to knock down all of the ware in an entire row.

Another embodiment of the invention is illustrated on FIGS. 20–25.

In FIG. 20, this form of transfer device is mounted in the same manner, as previously described herein, on various length brackets 19. Each forming machine section is the same as the one shown on FIG. 1, except for the fact that the machine section here is set-up for "single gobbing" operation and is equipped with a single cavity mold 210 and a single bottom plate 211. The formed ware shown therein is of irregular shape (a "panel" container). The transfer arm 80 is driven by motor 30 in the same manner described above.

This embodiment illustrates, in connection with single gobbing, rotating the ware through 45° during swinging movement of the transfer arms 80a–80f (FIG. 21). The arm lengths and horizontal location of their horizontal pivots (shafts 70) intermediate the molds 210 (FIG. 20) and the lehr belt are varied in the same manner as described under FIGS. 1 and 2. Thus, the ware is placed into single rows but oriented to rest obliquely on the lehr belt.

Referring to FIGS. 22–24, the single gob tongs mechanism of this embodiment will now be described.

The tongs mechanism 212 has an integral shaft 213 mounted in the end transfer arm 80 similar to the shaft 85 in the previously mentioned double gobbing tongs mechanism (see FIG. 5). The shaft 213 is an integral part of casting 214 which has an upstanding shaft 215 rotatably mounting the Geneva driver gear 216. The Geneva driver gear is in mesh with the bevel gear segment 102 at the outer end of the transfer arm, as previously described. As part of the Geneva driver gear 216, an arm segment 217 carries a pin 218 (see FIG. 24). The pin 218 is engageable in a slot 219 of Geneva wheel 220. The Geneva wheel is bolted to the top portion of the hub 221 of the tongs mechanism 212. Referring briefly to FIG. 25, it is seen that during the swinging movement of the arm 80 from its mold position to its lehr position, and after the swinging movement begins, the pin 218 engages the Geneva wheel slot 219 and drives the Geneva wheel through one station thereof. As shown in this embodiment, the Geneva drive is constructed as an eight station geneva and will provide for 45° of angular displacement of the tongs mechansim when the Geneva drive is operated through the one indexing station employed. This is illustrated by the relative positions of the center line of the flask or bottle between the mold position and the lehr position.

Referring again to FIG. 23, the hub 221 of the tongs mechanism is trunnion mounted to the casting 214 by the bearing plate 222. The hub casting forms a cylindrical holder sleeve similar to that of the numbered part 114 in FIG. 3 and defines therein a cylinder chamber for the operation of a piston 223 for closing the tongs 125. The piston rod 224 extends downwardly for driving the toggle links mechanism 123 for operating a single pair of ware handling tongs 125, as previously described. The piston 223 is single acting and held in its upper position for holding the tongs 125 in their open position by coil spring 225. The piston 223 is actuated in its downward movement against the spring 225 by pressure fluid introduced through the tongs operating valve 153, to the fluid passages through the arm 80 and into the central bore 226 of shaft 213, thence through opening 227 and into the cylinder head chamber 228. Exhaust flow is conducted in the same circuit but in the reverse direction of flow.

FIG. 22 is an overall view of the single gob tongs mechanism and is shown gripping a bottle 13 while resting on the bottom plate 211 of the single cavity mold.

As shown on FIG. 21, the 45° rotation principle employed by this embodiment of the invention will transfer containers from the forming molds to overlie the lehr belt and turned by 45° so that the major horizontal dimension of the ware is disposed obliquely to the direction of movement of the lehr belt. This arrangement takes advantage of a major amount of stability factor of the ware while resting in this position on the belt, and yet the ware is placed in such a fashion that if one upsets in the direction of its narrowest dimension or towards its least stable side, it will miss its neighbors. As is also illustrated on FIG. 21, successive transfers through the operation of the six transfer arms 80a–80f will place the containers in this aforementiond oriented position into six single file rows indicated A–F.

Still another orientation and transfer arrangement is indicated at FIG. 26. In this instance, the double gob transfer device, described in connection with FIG. 3 is utilized and the 45° Geneva drive construction, described in connection with FIGS. 24 and 25, is employed in place of the 90° Geneva drive of FIG. 3. In this construction, the pairs of bottles being transferred are rotated by 45° and placed with their major dimension obliquely to the lehr belt. By this arrangement, the six-section operation of the machine will result in seven single file rows being formed on the belt. These rows are indicated as A'—G'.

It is obvious that other rotational arrangements may be employed by charging the degree or design of the mechanical aspects described under the present invention. Accordingly, it is contemplated that various modifications and arrangements may be resorted to, but it is not intended that a patent granted hereon should be limited otherwise than by the scope of the appended claims.

The invention is claimed as follows:

1. The method of handling irregularly shaped molded articles which are shaped and adapted to stand in upright position on a horizontal bottom support with their axes vertical, said method comprising bringing the articles in succession in pairs spaced apart horizontally at fixed distances and at regular intervals for support on a pair of mold bottom plates, their major horizontal dimensions being aligned and directed forwardly, transferring the pairs of articles in succession from said bottom plates to a delivery station horizontally spaced forwardly from said bottom plates, each article being moved from the bottom plates to the delivery station in a path comprising horizontal and vertical components, the transfer operation comprising gripping the article while supported on the bottom plates, lifting them, moving them forwardly and lowering them at the delivery station, maintaining each of the articles with their axes vertical throughout the transfer, rotating the articles about an axis parallel to their vertical axes during the transfer to the delivery station so that the major horizontal dimension of each is in predetermined position of rotation, shifting the pair of articles horizontally toward each other during said rotation thereof to close the spacing therebetween, releasing the ware at said delivery station to a horizontally traveling conveyor which receives the articles in plural rows, the articles being oriented by said rotation so that their major horizontal dimension extends substantially parallel and at an angle of 45° with the direction of travel of said conveyor, the spacing between the articles in a direction normal to their major dimension being substantially equal to the height of the articles, whereby tipping of one article will avoid falling against other articles.

2. The method of handling irregularly shaped molded articles which are shaped and adapted to stand upright on a horizontal bottom support with their axes vertical, which method comprises bringing the articles in succession and at regular intervals to a mold bottom plate, their major horizontal dimension being directed forwardly, and transferring them to a moving conveyor spaced horizontally forward from the mold bottom plate, the transfer comprising gripping each article while the latter is in upright position resting on the mold bottom plate, lifting the article, moving it forwardly toward the moving conveyor, maintaining the article in upright position during the transfer and orienting it with respect to the conveyor by rotation about its axis so that its major horizontal dimension is at a 45° angle to the direction of travel of the conveyor, releasing the article to the conveyor in spaced relationship to other articles thereon substantially equal to the height of the article so as to prevent tipping of one article from falling against the other articles, and advancing the articles in succession on the conveyor with the articles relatively arranged in a row.

3. The method of transferring glassware articles formed by a plural mold machine having a plurality of longitudinally aligned spaced ware forming mechanisms, each said mechanism having a double cavity forming whose mold centers are aligned transversely of said longitudinal alignment of the forming mechanisms, comprising directing a belt conveyor successively past each of said ware forming mechanisms, transferring the formed articles in pairs in succession horizontally to overlie the belt conveyor, the transfer comprising gripping each pair of articles while the latter are standing upright on a horizontal bottom support on their ware forming mechanism and with their axes vertical, lifting the articles to clear their ware forming mechanism, thence moving them toward the belt conveyor through an arcuate path during which time the said articles are maintained in upright position, pairs of articles that originate from different forming mechanisms being moved a different amount in the horizontal direction, rotating each pair of articles in unison about a vertical axis parallel to their said vertical axes during their transfer for orienting them at a 45° angle with respect to the direction of travel of the conveyor, shifting the pair of articles during transfer to arrange their relative spacing, and releasing each pair of articles for support by the conveyor so that successively formed pairs of articles will form a plurality of single file rows thereon, said articles being spaced apart on the conveyor by a distance substantially equal to the height of the articles so as to prevent a tipped article falling against adjacent articles.

4. The method of successively transferring formed glassware in hot, deformable condition in pairs from the mold bottom plates of a double cavity, multi-section machine having a plurality of longitudinally aligned, spaced ware forming mechanisms, comprising directing a belt conveyor successively past each of said forming mechanisms and in a straight path of continuous movement through an annealing lehr, gripping the ware in pairs while supported on said bottom plates, moving the gripped ware through an arcuate path individual from each said forming mechanism, each individual path terminating over a different lateral position across the conveyor, maintaining said ware upright while moving it through its said individual path, rotating said gripped ware about a vertical axis during said movement for orienting it upon delivery to the conveyor, having the ware of each pair horizontally with respect to each other coincident said rotation to change their axial spacing, and releasing the ware at the end of said arcuate path for support on said conveyor, said rotation of the ware being such that its major horizontal dimension is disposed 45° to the direction of movement of the conveyor and said horizontal movement of the ware and said release thereof provides a spacing between the articles normal to their major dimension substantially equal to the height of the articles, successive transfers of ware forming plural rows on the conveyor, the number of said rows being in excess of the number of said forming mechanisms of the machine.

5. The method of transferring hot, deformable glassware articles which are successively formed to stand in upright position in the finishing molds of a plural section forming machine, the machine having its plural sections longitudinally aligned in spaced relationship and operated to successively form the hot, deformable ware articles in pairs with their axes aligned transversely of the longitudinal alignment of the sections, comprising the steps of gripping the hot, deformable pair of articles while supported by their finishing mold and swinging said articles through a vertical arcuate path toward and terminating at a delivery position horizontally disposed from said aligned sections, the articles being moved through parallel arcuate paths from their said mold of origin and each said path being of different length from the others and terminating at horizontally staggered delivery positions, rotating each pair of articles collectively by approximately 45 degrees about a common vertical axis during their transfer, moving a conveyor continuously to travel past the molds of said sections in the direction of alignment of said sections and successively past each of said sections and beneath all of said delivery positions and then into and through an annealing lehr, and releasing each pair of articles at the end of their said arcuate movement and while over said conveyor, whereby pairs of articles transferred from the different sections of the machine are deposited on the conveyor at different lateral positions thereon in plural, spaced apart, single file rows of ware, whereupon said rows of ware are conveyed thereon into and through the annealing lehr for annealing, each said transferred pair being oriented in a different single file row of said plurality of rows.

6. The method of transferring hot, deformable glassware articles which are successively formed to stand in upright position in the finishing molds of a plural section forming machine, the machine having its plural sections longitudinally aligned in spaced relationship and operated to successively form the hot, deformable ware articles in pairs with their axes aligned transversely of the longitudinal alignment of the sections, comprising the steps of gripping the hot, deformable pair of articles while supported by their finishing mold and swinging said articles through a vertical arcuate path toward and terminating at a delivery position horizontally disposed from said aligned sections, the articles being moved through parallel arcuate paths from their said mold of origin and each said path being of different length from the others and terminating at horizontally staggered delivery positions, rotating each pair of articles collectively by approximately 90 degrees about a common vertical axis during their transfer, moving a conveyor continuously to travel past the molds of said sections in the direction of alignment of said sections and successively past each of said sections and beneath all of said delivery positions and then into and through an annealing lehr, and releasing each pair of articles at the end of their said arcuate movement and while over said conveyor, whereby pairs of articles transferred from the different sections of the machine are deposited on the conveyor at different lateral positions thereon in plural, spaced apart, single file rows of ware, whereupon said rows of ware are conveyed thereon into and through the annealing lehr for annealing, each said transferred pair being oriented in the same single file row of said plurality of rows.

References Cited in the file of this patent

UNITED STATES PATENTS

| | | |
|---|---|---|
| 1,109,284 | Friel | Sept. 1, 1914 |
| 1,681,863 | Lahr | Aug. 21, 1928 |
| 1,691,497 | Rowe | Nov. 13, 1928 |
| 1,905,476 | Lorenz | Apr. 25, 1933 |
| 1,911,119 | Ingle | May 23, 1933 |
| 1,999,742 | Smith | Apr. 30, 1935 |
| 2,050,547 | Thayer | Aug. 11, 1936 |
| 2,253,155 | Wadman et al. | Aug. 19, 1941 |
| 2,599,937 | Petrilli | June 10, 1952 |
| 2,914,162 | Anger | Nov. 24, 1959 |